Patented Jan. 12, 1954

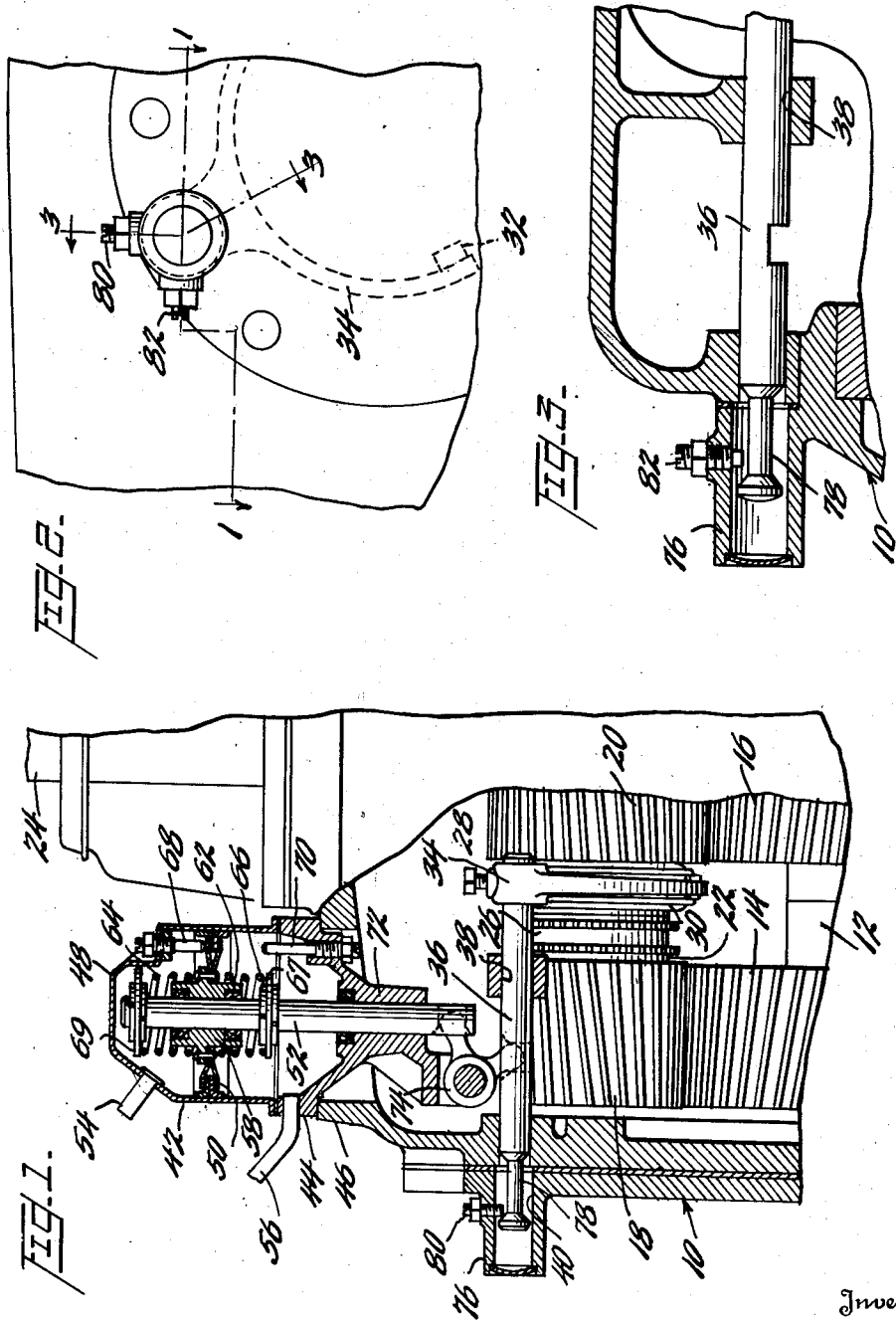

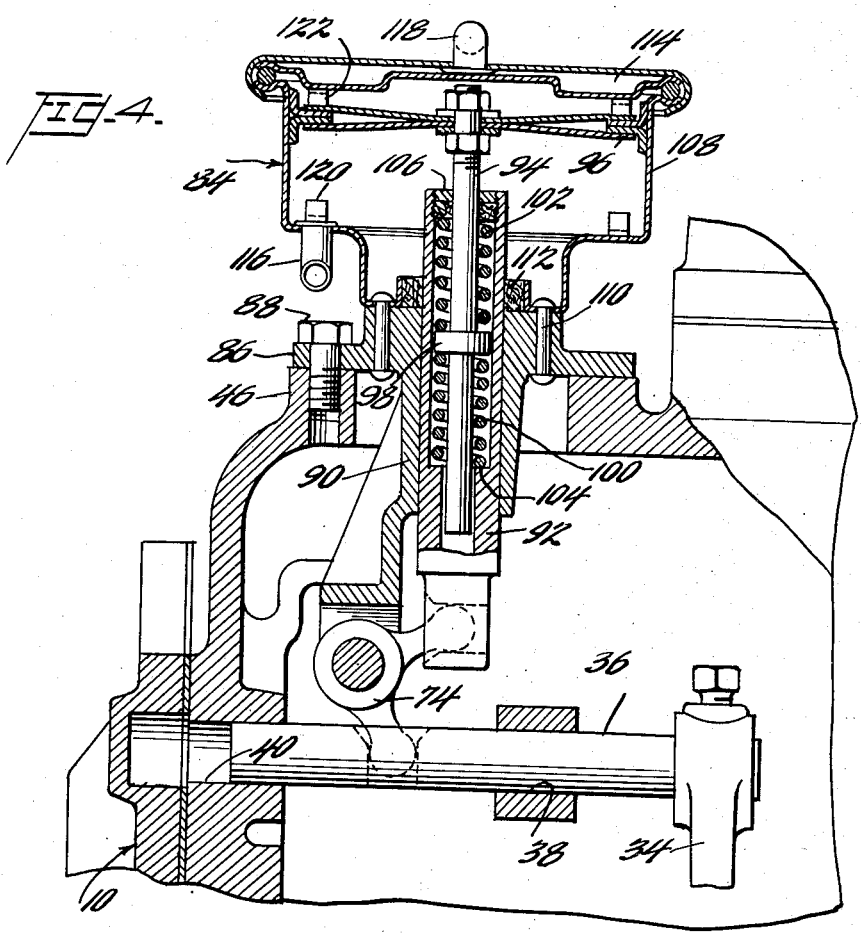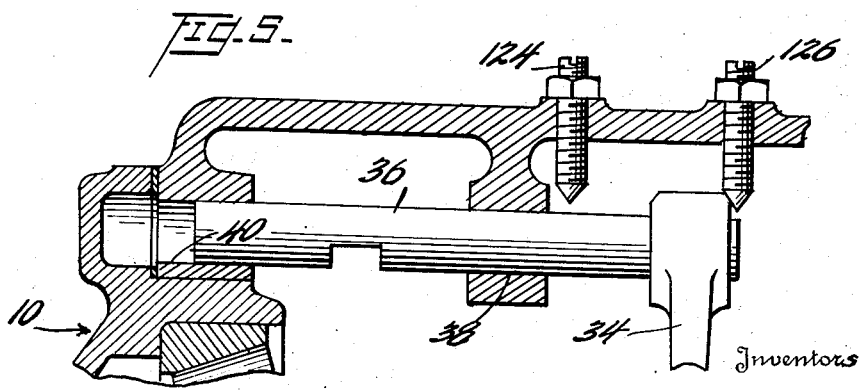

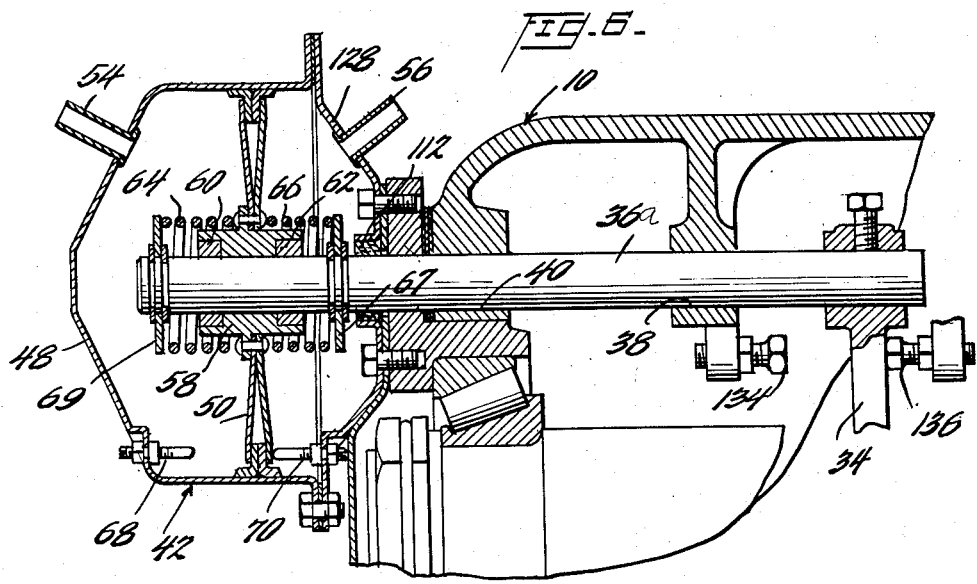
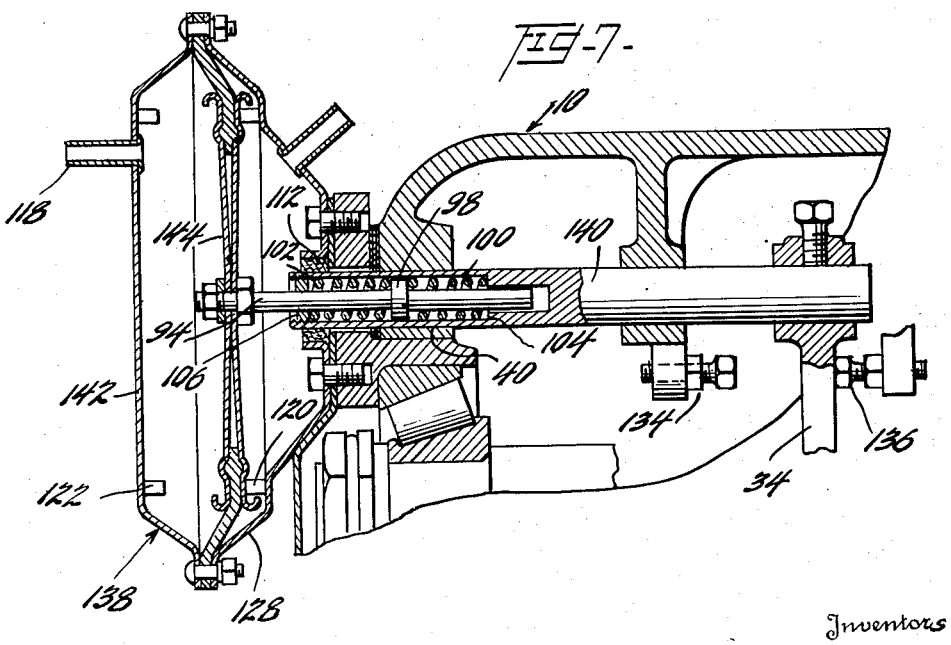

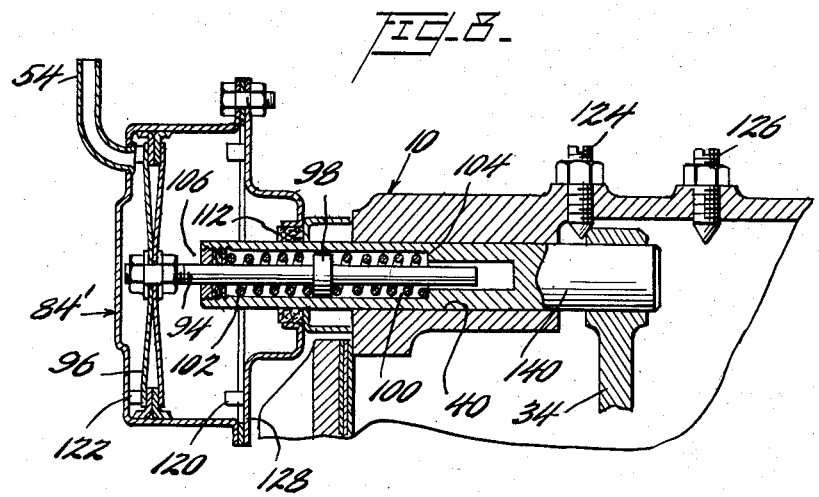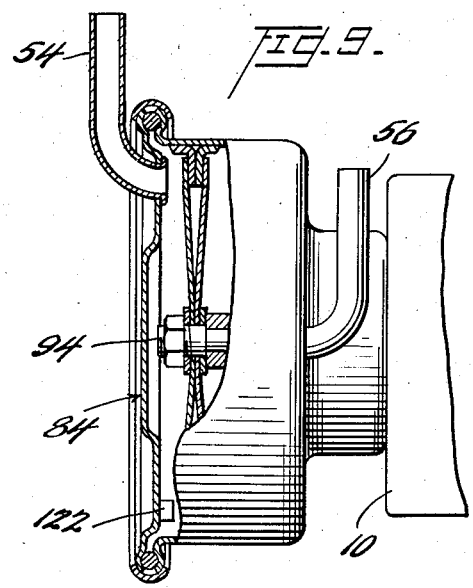

2,665,593

UNITED STATES PATENT OFFICE 2,665,593

POWER TRANSMITTING MECHANISM

Ivor H. Williams, Birmingham, and Ralph K. Super, Detroit, Mich., assignors, by mesne assignments, to Rockwell Spring and Axle Company, Coraopolis, Pa., a corporation of Pennsylvania Application September 3, 1943, Serial No. 501,172

8 Claims. (Cl. 74—364)

This invention relates to an improved pneumatically actuated mechanism and has particular reference to an improved pneumatically actuated mechanism for operating a positive clutch or gear shift mechanism.

This invention in its preferred embodiment constitutes an improvement to the clutch actuating mechanism disclosed in Brownyer Patent No. 2,398,407, issued April 16, 1946.

In the operation of motor vehicles such as trucks, buses and even passenger automobiles it has been found desirable to provide more than the three conventional gear ratios between the engine and the driving wheels of said vehicles. Increasing the range of gear ratios provides increased traction effort at low speed in the case of buses and trucks and in the case of all such vehicles provides improved fuel economy and durability att high speed by reducing the engine speed necessary to maintain a predetermined road speed when the power required to maintain the road speed is not excessive. While it has been heretofore proposed to increase the range of gear ratios by providing additional gears in the vehicle transmission, this object can be more readily and conveniently obtained by providing different gear ratios between the drive shaft and the vehicle drive axle, combined with manually or automatically controlled means for selecting the gear ratio appropriate to the particular circumstances. The provision of two gear ratios at the vehicle drive axle selectively engageable by suitable clutch mechanism, has the effect of doubling the range of ratios provided by the conventional vehicle transmission, and for this reason two-speed axles have gone into rather wide use, particularly in heavy duty vehicles.

Because of the high torque transmitted from the drive shaft to the vehicle drive axles, particularly in the case of large vehicles, such as trucks and buses, it has been found necessary to utilize a positive type clutch for selectively engaging the different ratio gear trains, in order to maintain the mechanism within reasonable limits as to size and complication.

The Brownyer patent referred to above discloses an improved positive clutch mechanism particularly adapted for use in two speed axles. This is a positive type clutch having annularly arranged teeth on the drive pinions of the two gear trains and cooperating teeth in a clutch collar which is slidably engaged with the drive shaft on which the two drive gears are journalled.

The release and engagement of the positive type clutch of the type indicated presents many difficulties which the prior art has long attempted to solve. In the improved clutch mechanism disclosed in the aforesaid Brownyer patent these difficulties have been in large part solved by providing the teeth of both the drive pinions and the slidable clutch collar with smooth end faces lying entirely within parallel surfaces of revolution generated by lines rotated about the axis of the drive shaft and by providing such clearances or backlash between the clutch teeth when engaged with either pinion that the teeth, when engaged end-to-end and relatively rotating will not intermesh until the two cooperating tooth carrying elements are in a condition of substantial synchronization.

Because of the novel construction of the improved clutch mechanism, as indicated above and fully described in the aforesaid Brownyer patent, it has been found that in order to obtain smooth shifting of the clutch without clash or shock it is necessary to apply a smaller force to the slidable clutch element to engage its teeth with the teeth of the drive gear element to which the drive is shifted than the force required to disengage the teeth of the slidable clutch element from the teeth of the drive gear element with which it is immediately engaged. If the same force is used to disengage and reengage the positive clutch, a certain amount of shock or undesirable clashing of the clutch teeth will result because of the large force exerted to engage the clutch teeth before a condition of substantially complete synchronization of the corresponding clutch elements has been achieved. While a heavy force is necessary to quickly disengage the clutch at the instant of torque interruption, to avoid the possibility of the direction of torque delivery reversing and locking the parts in mesh, a materially lower force is sufficient to mesh the clutch teeth, and the application of such a light force is highly desirable as it will engage the clutch smoothly and positively without any shock or clashing of the teeth or injury to the clutch parts. A ratio of the disengaging and engaging forces of from 4 to 1 to 6 to 1 has been found desirable in actual practice.

Since the two-speed rear axle clutches of most modern vehicles, particularly the larger vehicles such as buses and trucks, are operated by pneumatically actuated power units utilizing either engine manifold vacuum or compressed air, the invention contemplates the construction of such pneumatically actuated units to render them operative to exert different forces for disengaging and reengaging the two speed rear axle clutches of such vehicles.

It is therefore among the objects of the present invention to provide an improved pneumatically actuated clutch operating mechanism which will exert a relatively heavy clutch disengaging force and a relatively light clutch engaging force, in which there is a definite staging of pressures or a sharp drop in pressure after the clutch collar has been disengaged from either gear.

A further object resides in the provision of a clutch operating unit of the character indicated which will continue to exert the required force in either selected direction on the clutch mechanism until the gear changing operation has been completely accomplished and which will automatically vary the force exerted between the clutch disengaging and the clutch engaging phases of the operation.

A further object resides in the provision of a pneumatically actuated clutch operating unit of the character indicated which may be mounted on the two-speed axle housing without necessitating any material change in the size of the housing or interfering in any way with the operation of the vehicle and its accessories.

Further objects and advantages will be more particularly pointed out hereinafter or will become apparent or the description proceeds.

In the accompanying drawings, in which like reference numerals are used to designate similar parts throughout, there is illustrated in six slightly varying forms, a suitable mechanical embodiment for the purpose of illustrating the invention. The drawings, however, are for the purpose of illustration only and are not to be taken as limiting or restricting the invention as it will be apparent to those skilled in the art that various changes in the illustrated embodiments may be resorted to without in any way exceeding the scope of the invention.

In the drawings:

Figure 1 is a plan view of a fragmentary part of a vehicle differential gear housing, a portion being broken away and shown in section to illustrate the application thereto of a clutch operating unit constructed according to the invention;

Figure 2 is an elevational view of a fragmentary portion of the gear housing illustrated in Figure 1, showing the application thereto of stop members for limiting the travel of the clutch member;

Figure 3 is a sectional view of a portion of the gear housing illustrated in Figure 1, showing in greater detail the construction and arrangement of one of the limit stop members illustrated in Figure 2;

Figure 4 is a sectional view of a portion of the gear housing illustrated in Figure 1, showing the application thereto of a somewhat modified form of clutch operating unit;

Figure 5 is a sectional view of a fragmentary portion of the gear housing, showing the application thereto of a modified form of stop member for limiting the travel of the clutch member;

Figure 6 is a sectional view of a fragmentary portion of the gear housing showing the application thereto of a still further modified form of such operating unit;

Figure 7 is a view similar to Figure 6, but shows a still further modified form of operating unit;

Figure 8 is a view similar to Figures 6 and 7, but shows a further modified form of clutch operating unit, and Figure 9 is an elevational view on an enlarged scale of the clutch operating unit shown in Figure 8, a portion being broken away and being shown in section to illustrate the application of the pneumatic conduits thereto.

Construction of the form of invention illustrated in Figures 1, 2 and 3.

Numeral 10 generally indicates a differential gear housing into which project oppositely extending vehicle drive axles, not illustrated, operatively associated with a suitable or conventional differential gear mechanism 12.

The differential mechanism 12 is selectively driven by either one of two spur gears 14 and 16 journalled in the housing 10 and continuously meshed with respective drive gear elements 18 and 20. The drive gear element 18 and its associated spur gear 14 provide one gear ratio and the drive gear element 20 and the spur gear 16 being of different sizes from the respective drive gear 18 and spur gear 14 provided a different gear ratio for driving the differential mechanism 12. The gears 18 and 20 are carried on a shaft 22 journalled at its ends in the gear housing 10 and driven from the impeller shaft 24 through a suitable gear drive, not illustrated but clearly exemplified in the Brownyer patent referred to above. The gear elements 18 and 20 are provided on their adjacent ends with respective annular sets of clutch teeth 26 and 28 and the shaft 24 is provided between the gears 18 and 20 with an annular series of teeth or splines upon which is slidably mounted the clutch member 30 so that the clutch member may move between a position in which it engages the teeth of the gear 18 and a position in which it engages the teeth of the gear 20, but is driven by and rotatable with the drive shaft 22. This clutch member 30 comprises an annular collar provided with internal teeth engaging in the teeth or splines of the drive shaft and with teeth engageable with the gear carried clutch teeth 26 and 28 and has an external annular groove in which are engaged the rollers, one of which is indicated at 32 in Figure 2, of a fork or yoke member 34 mounted on shift bar or rail 36 supported by the housing and extending through apertures 38 and 40 provided therein. Since toothed clutch member 30 is splined on drive shaft 22, and may be meshed with either of gears 18 or 20, the clutch member is a torque and power transmitting member.

The actuating device, generally indicated at 42, comprises a pad or base member 44 mounted on an annular boss 46 of the housing 10 and retained thereon by suitable means such as cap screws, not illustrated, and a dome or cylinder 48 secured to the base 44 and containing a piston 50 and reciprocable shaft 52. Fluid conduits 54 and 56 lead into the interior of the dome 48 on opposite sides of piston 50 and extend from the actuating mechanism 42 to a suitable manually operated selecting valve, not illustrated. Shaft 52 slidably extends through cylindrical member 58 secured adjacent its center to the piston 50 and carrying at its opposite ends packing seals 60 and 62 which prevent leakage of air along the bearing surface between shaft 52 and cylindrical member 58. Coiled compression springs 64 and 66 which bear at their adjacent ends on an annular flange provided on the exterior of the member 58 and at their opposite ends on abutments 67 and 69 secured to the shaft 52 act to resiliently center shaft 52 relative to member 58. The travel of piston 50 is limited to the intermediate portion of dome or cylinder 48 by means of adjustable limit stops 68 and 70 for a purpose to be presently described.

The shaft 52 projects into the casing 10 through an annular boss 72 formed on the base member 44 and at its inner end is operatively associated with one arm of a bell crank lever 74 pivotally mounted on a lug of the base 44 and having its other arm operatively associated with shift rail 36 so that reciprocating movements of the shaft 52 are transmitted to the shift rail.

At its end opposite the clutch yoke 34 the shift rail 36 extends into an annular boss 76 and is provided with an annular recess 78. A set screw 80 extending through the wall of the boss 76 projects into the recess 78 and contacts the bar 36 at the outer end of the recess to limit travel of the bar to the right, as viewed in Figure 1. A similar set screw 82 extending through the wall of the boss at an angular distance from the set screw 80 and particularly illustrated in Figures 2 and 3, also projects into the annular recess 78 to contact the bar at the inner end of the recess and limit the travel of the bar to the left, as viewed in Figures 1 and 3. The shoulders at the opposite ends of the recess 78 are preferably tapered, so that the limiting positions of the bar 36 may be adjusted by screwing the set screws 80 and 82 into or out of the boss.

Operation of the improved clutch actuator

Assuming that the clutch is engaged with the gear 20, as illustrated in Fig. 1, if now compressed air be admitted through the conduit 54 or vacuum be applied to the conduit 56, the piston 50 will be moved downwardly until the lower end of the annular member 58 contacts the lower spring abutment 67 on the shaft 52. When this occurs shaft 52 is arrested, due to the friction set up by the driving tooth pressure. As soon as the tooth pressure is relieved, by interrupting the application of driving torque, shaft 52 is moved downwardly under the full pressure of the piston, moving the shift bar 36 to the left and disengaging the clutch collar from the teeth on the gear 20. It is to be understood that the parts are so proportioned that when the shaft 52 has moved a sufficient distance to disengage the clutch collar from the gear 20 the piston 50 will come in contact with the upper end of the limit stop 70 and travel of the piston will thereupon cease but the compressed spring 66 thereafter will exert a downward force on the shaft 52 with a magnitude materially less than the downward force exerted by the piston. In other words the full force of the piston is taken off the shifter rod after unmeshing, and before the clutch collar is engaged with the other gear. At this point there is a definite reduction or staging of forces and thereafter spring 66 will resiliently urge the clutch collar towards the left as viewed in Figure 1 and cause the ends of the clutch collar teeth to slidingly engage the ends of the teenth of gear 18 under a yielding pressure. As soon as gear 18 synchronizes with the drive shaft upon which it is mounted, the spring will move the clutch collar the remaining distance to mesh the collar with the teeth on the gear 18, it being understood that the parts are brought into synchronism by accelerating the vehicle engine.

In shifting the drive from the gear 18 to the gear 20, the same sequence of operation occurs, except that in this case the piston 50 is moved upwardly by the air or vacuum pressure differential disengaging the collar from the teeth on the gear 18 and then contacting the limit stop 68, after which the expansive force of the spring 64 alone moves the shaft 52 to the position illustrated in Figure 1, to mesh the collar with the teeth of the gear 20, upon synchronism being attained. The stops 68 and 70 are so spaced that they will stop the piston when the clutch collar 30 is in its neutral position between the two gears 18 and 20. The force exerted by the spring on shaft 52 is less than the force exerted on the shaft by the piston 50, the ratio of the two forces being in the neighborhood of 1–4 or 1–6 for certain installations. Since the meshing of the clutch teeth is accomplished by the force of the spring 64 or 66, rather than by the larger force exerted by the piston 50, smooth engagement of the clutch teeth upon synchronism, without chatter or shock or injury to the clutch parts is accomplished.

Since the springs will continue to exert a light pressure after the clutch collar is fully meshed with the clutch teeth on the gear 18 or gear 20, the shift rail limit stops are provided to relieve the shifting fork or yoke from this pressure and thus reduce wear on the fork ends and the sides of the annular groove in the clutch collar.

In the further embodiment of Figures 4 and 5, the clutch actuating mechanism is arranged to provide a shorter dome or cylinder in proportion to the force exerted on the shift bar 36.

A modified base member 86 is secured to the gear housing boss 46 by the cap screws 88 and is provided with an elongated cylindrical boss 90 at the center thereof, in which is reciprocably mounted a hollow shaft 92 engaged at its lower end with the bell crank lever 74 and which telescopically receives a stem 94 rigidly connected at its upper end to the center of the piston 96. Within the hollow shaft 92 the stem 94 is provided with an annular enlargement 98 constituting abutments for the adjacent ends of coiled compression springs 100 and 102. The end of the spring 100 opposite the abutment 98 bears against an annular shoulder 104 provided internally of the shaft 92, while the opposite end of the spring 102 bears against an abutment 106 screw threaded into the open end of the spring receiving bore in the shaft 92 surrounding the stem 94. The piston 96 reciprocates in a cylinder 108 secured to the base 86 by suitable means, such as the rivets 110 and carries a packing seal 112 surrounding and bearing against the shaft 92. The outer end of the cylinder 108 opposite the base 86 is closed by a suitable cover 114 secured thereto in any suitable manner, such as by being beaded at its edge over an annular bead provided on the end of the cylinder, as particularly illustrated in Figure 4.

Pneumatic conduits 116 and 118 lead from a selecting valve into the cylinder 108 at opposite sides of the piston 96 and limit stop members 120 and 122 are provided for limiting the travel of the piston. The limit stops 120 and 122 however are not adjustable, being welded to the inner surface of the cylinder or formed integrally therewith, and are of such a length only as to protect the leather cups which lie around the periphery of the piston and provide a seal between the piston and the cylinder.

The means for limiting the travel of the shift bar 36 is particularly illustrated in Figure 5, and comprises a pair of set screws 124 and 126 threaded through suitable apertures in the gear housing 10 at opposite sides of the shift fork 34. The ends of these set screws are cone-shaped and the edges of the boss portion of the fork are beveled so that an adjustment of the limiting positions of the fork can be obtained by screwing the set screws 124 and 126 into or out of the gear housing. If desired, suitable lock units or washers may be utilized to limit the projection of these set screws into the housing.

Operation

In this form of the invention, when the piston 96 is moved downwardly by fluid pressure the stem 94 will move relative to the spring carrying shaft 92 compressing the spring 100. After a limited amount of relative movement between the stem and the shaft the spring 100 becomes solid and the entire force exerted by the piston is then applied to the shift bar 36 to disengage the clutch collar from gear 20. As soon as the tooth load between gear 20 and the drive shaft 22 is relieved, the clutch collar will move out of engagement with the clutch teeth on this gear and the piston will continue its downward movement until it strikes the lower limit stops 120, at which point in the piston travel the clutch will be in its neutral position between the two gears 18 and 20. The compressive force of the spring 100 is now exerted on the shift bar 36 to move the clutch collar into engagement with the teeth of the gear 18, and movement of the parts into final meshed condition will occur as soon as gear 18 and drive shaft 22 reach a condition of synchronization. Upward movement of the piston 96 operates in the same manner to shift the clutch collar out of mesh with the gear 18, and to mesh it with gear 20, utilizing the compressive force of the spring 102 as described above in conjunction with spring 100. In this case the piston will come in contact with the upper limit stop 122 when the clutch collar is in its neutral position between the gears 18 and 20.

The modified form of the device shown in Figure 6 is a simplification of the one shown in Figure 1, omitting the separate shaft 52 and bell crank lever 74 and may be used where there is room to mount the clutch actuating unit at one side of the axle housing and permit it to project some distance laterally toward one of the rear wheels. While this simplification and resulting economy of parts is highly desirable, it can not be used in some installations because of interference of brake or shock absorber mechanism or other component parts of the vehicle with the actuating unit when in such a location.

In this modified arrangement dome or cylinder 48 is secured to base member 128, which may be similar to base member 44 of Figure 1 or may be of modified form stamped from sheet metal in the same manner in which the cylinder is formed. The shift bar or rail 36 is elongated and projects through the side of the gear housing 10 and base member 128 is secured to the gear housing surrounding the shift bar with a packing seal 112 in sealing contact with the shift bar adjacent the outer surface of the gear housing. Cylindrical member 58 is slidably received on the outer end of the bar 36 between two abutments 67 and 69 fixed to the bar in spaced relationship, and is provided intermediate its length with an annular flange secured to the piston 50. The flange constitutes an abutment for the adjacent ends of the compression springs 64 and 66 while the abutment 67 contacts the opposite end of the spring 66 and the abutment 69 contacts the opposite end of the spring 64. Limit stops 68 and 70 are provided to limit the piston travel from the engaged to the neutral position of the clutch collar. The expansive force of the springs 64 and 66 thereafter causes the engagement of the collar with the gear clutch teeth in a manner similar to that described in connection with Figure 1. The coaction between the cylindrical member 58 and the abutments 67 and 69, for applying the full force of the piston 50 in the clutch disengaging phases of the shifting operation is also the same as that previously described.

In this arrangement the travel of the shift bar 36 is limited by the adjustable limit stops 134 and 136 comprising cap screws threaded through apertured lugs secured to or integral with the housing 10, and so positioned that the end surfaces of the head portions thereof contact the yoke 34 at the opposite ends of its clutch shifting travel. The screws are secured in adjusted position by suitable lock nuts in a manner well known to the art. These stops function to relieve the shift fork and clutch of pressure when the clutch is meshed with either gear, to avoid wear during operation, in the manner described in conjunction with the previously disclosed forms of the invention.

In the form of the invention shown in Figure 7, the clutch operating unit, generally indicated at 138, is located at one side of the gear housing 10 in the location illustrated above in Figure 6. A base member 128 is secured to the side of the gear housing surrounding the projecting end of the modified shift rail 140 and a cover member 142 is peripherally secured to the base member to provide a chamber for a diaphragm 144 peripherally secured between the edges of the base member 128 and cover member 142. The shift bar 140 is provided with a bore in the end portion thereof, within which is slidably received stem 94 secured at its outer end to the center of the diaphragm 144. Annular enlargement 98 on the stem is disposed between the adjacent ends of springs 100 and 102 the opposite ends of which bear respectively on abutments 104 and 106 as described in connection with Figure 4. Limit stops 120 and 122 carried by the base member 128 and cover member 138 respectively limit the travel of the diaphragm 144 so that the shift force of the diaphragm is applied only to that phase of the shifting operation which involves disengaging the clutch collar from the gear clutch teeth with which it is engaged, the meshing of the clutch collar with the gear teeth being accomplished by the expansive force of one or the other of the springs 100 or 102 as described in connection with Figure 4.

In the further modified form of the invention shown in Figures 8 and 9, the shift bar 140 and stem 94 of the form shown in Figure 7 is combined with a cylinder and piston mechanism similar to that shown in Figure 4. The cylinder and piston of Figure 9 is substantially identical with that of Figure 4 while in Figure 8 the parts have been somewhat reversed so that the cover portion forms the cylinder and is secured to a relatively flat base portion such as the base portion 128 of Figure 6. Thus the construction is substantially the same as that described above in connection with Figure 7, except that a piston and cylinder are substituted for the chamber and diaphragm of that modification, the piston and cylinder operating in the same manner as the piston and cylinder of Figure 4 described above. This modification utilizes the yoke limit stop elements illustrated in Figure 5 but it is understood that any other of the limit stop devices illustrated or other suitable elements may be used for this purpose if so desired.

The various modifications illustrated are all similar in construction and substantially the same in operation, but the drawings clearly illustrate the respective manners in which the component parts of various forms may be put together in different combinations to produce operative devices constructed and arranged according to the invention and functioning in a manner to efficiently accomplish the various objects set forth above.

While six slightly different embodiments have been illustrated in the accompanying drawings and hereinabove described for the purpose of disclosing the invention, it is to be understood that the invention is not limited to the particular embodiments so illustrated and described but that various changes in the size, shape and arrangement of the parts may be resorted to without in any way exceeding the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Fluid actuated gear shift mechanism comprising a movable fluid pressure responsive element, a reciprocable control member, cooperating stop means and means providing resilient actuating connections between said element and said member for effecting sequential two stage movement of said member upon movement of said element in either direction, further stop means in said mechanism limiting the overall range of travel of said member and means for adjusting said further stop means for accurately determining the limit positions of said reciprocable control member.

2. In a fluid actuated clutch shift mechanism, a movable fluid pressure responsive element, a reciprocable shifter rail having a slidable resilient connection with said element, a clutch collar connected to reciprocate with said shifter rail, reversible means operable during a first stage for substantially positively coupling said element and shifter rail for compressing said resilient connection and moving said rail in a selected direction in response to fluid pressure, said clutch collar being disengaged from a coacting clutch member during said first stage, stop means for arresting said movement of said element while permitting said resilient means to expand and urge said rail in the same direction during a second stage to engage said clutch collar with another clutch member, said resilient means exerting appreciably less force than said fluid pressure responsive means, and further stop means limiting movement of said rail by said resilient means.

3. Apparatus for shifting a toothed power transmitting member shiftably mounted within a drive housing between mesh with one or the other of two spaced toothed drive transmission parts comprising a casing adapted for mounting over an aperture in said housing, a fluid pressure responsive element movable between limits within said casing, a reciprocable shaft connected by motion transmitting linkage to said power transmitting member within said housing, a bearing support rigid with said casing slidably supporting said shaft within said housing, resilient means adapted to be compressed upon movement of said element in either direction operatively interconnecting said element and said shaft, means operative when said resilient means is compressed for positively connecting said fluid pressure responsive element to said shaft so that said shaft is displaced by the fluid pressure powered stroke of said element for an initial portion of its travel in either direction to effect a first shift stage of said member wherein said member is demeshed from one of said parts and moved toward the other, and means stopping said element at the end of said first stage while permitting said shaft to continue its movement in the same direction to effect a further shift stage of said member wherein said member is meshed with the other of said parts under materially reduced power by release of energy stored in said compressed resilient means during said first stage.

4. In the apparatus defined in claim 3, said motion transmitting linkage comprising a reciprocal shifter rail connected to said member, and a bell crank pivoted on said support and operatively connected to said shaft and said rail.

5. In a speed ratio selecting mechanism, a double acting pressure differential operated motor comprising a double ended cylinder member, a power element reciprocable within the cylinder member, a force transmitting transmission operating rod slidably mounted within the power element and slidably mounted in one end of the cylinder member, a flange member mounted on one end of the rod, a second flange member also mounted on said rod, a force transmitting yieldable member interposed between one face of the power element and one of said flange members, another force transmitting yieldable member interposed between the other face of the power element and the other of said flange members, a stop member secured to one end of the cylinder and projecting therein toward said element, said member serving as a stop for the power element when the same is power operated in one direction of its movement, a second stop member secured to the other end of the cylinder and projecting therein toward said element, said second stop member serving as a stop for the power element when the same is power operated in the other direction of its movement, two spaced toothed clutch jaws connected to different speed ratio drives and a toothed clutch collar reciprocable between mesh with one or the other of said jaws, a positive motion transmitting connection between said rod and said clutch collar, and means operative upon fluid powered movement of said power element in either direction for compressing one of said yieldable members and then positively connecting said power element with said rod to demesh said collar from one of said jaws and move it toward the other of said jaws under said fluid pressure power, said stops each being located to arrest movement of said element before said clutch collar engages said other of said jaws, and said compressed yieldable member being then free to react against the stopped power element and continue movement of said rod in the same direction to mesh the said clutch collar with said other jaw under materially reduced power.

6. Fluid actuated speed changing mechanism for a vehicle axle comprising variable speed gearing at the axle having an actuating member movable between two positions in which relatively high and low speed gears respectively are clutched in drive torque transmitting relation with a power driven part, means for moving said actuating member between said positions comprising means defining a fluid pressure chamber, a pressure responsive member movable within said chamber in response to a pressure differential on opposite sides, a reciprocable shaft slidably connected to said pressure responsive member, abutments on said shaft on opposite sides of said pressure responsive member within the chamber, a compression spring between each abutment and said pressure responsive member, motion transmitting linkage interconnecting said shaft and said actuating member, stop means at opposite ends of said chamber each operative for arresting movement of said pressure responsive member after a fluid pressure differential has been established in said chamber and said pressure responsive member has moved to compress one of said springs, and means operative after said spring has been compressed and before said pressure responsive member is arrested for positively interconnecting said pressure responsive member and said shaft so as to move said shaft sufficiently to effect declutching of the gear hitherto clutched to said power driven part under relatively high fluid pressure power after release of said drive torque, said compressed spring then expanding with a force of less magnitude to further move said shaft in the same direction until the hitherto declutched gear is clutched to said power driven part.

7. Fluid actuated gear shift mechanism comprising two spaced gears and a power driven toothed member selectively movable into torque transmitting engagement with either of said gears for obtaining different drive speed ratios, means for moving said toothed member from driving engagement with one of said gears into driving engagement with the other of said gears comprising means defining a fluid pressure chamber, a pressure responsive member movable within said chamber in response to a pressure differential on opposite sides, a reciprocable shaft slidably connected to said pressure responsive member, abutments on said shaft on opposite sides of said pressure responsive member within the chamber, a compression spring between each abutment and said pressure responsive member, motion transmitting linkage interconnecting said shaft and said toothed member, stop means at opposite ends of said chamber each operative for arresting movement of said pressure responsive member after a fluid pressure differential has been established in said chamber and said pressure responsive member has moved to compress one of said springs and means operative after said spring has been compressed and before said pressure responsive member is arrested for positively interconnecting said pressure responsive member and said shaft so as to move said shaft sufficiently to disengage said toothed member from said one gear with relatively high fluid pressure power after release of drive torque therebetween, said compressed spring then expanding with a force of less magnitude to further move said shaft in the same direction to move said toothed member into driving engagement with said other gear.

8. Speed change mechanism for a vehicle transmission comprising variable speed gearing at the transmission having an actuating member movable between two positions in which relatively high and low speed gears respectively are clutched in drive torque transmitting relation with an engine driven part, means for moving said actuating member between said positions comprising a reciprocable power driven member, stops limiting travel of said power driven member in either direction, a spring connected to be energized by movement of said power driven member, means operative upon the power stroke of said power driven member for energizing said spring and positively connecting said power driven member to said actuating member for moving the actuating member to declutch the hitherto clutched gear corresponding to one drive speed under relatively high power, means comprising said stops for arresting movement of said power driven member after said declutching and operatively connecting the energized spring to the actuating member for continuing movement of said actuating member to clutch to the engine driven part the hitherto declutched gear corresponding to the desired drive speed with reduced force, and further stop means positively limiting spring actuated movement of said actuating member in either direction.

IVOR H. WILLIAMS.
RALPH K. SUPER.

References Cited in the file of this patent

UNITED STATES PATENTS

| Number | Name | Date |
|---|---|---|
| 1,740,818 | Killingsworth | Dec. 24, 1929 |
| 1,898,190 | Kohler | Feb. 21, 1933 |
| 2,071,785 | Ehrlich | Feb. 23, 1937 |
| 2,121,157 | Lempereur et al. | June 21, 1938 |
| 2,141,953 | Hawes | Dec. 27, 1938 |
| 2,206,771 | Dugas | July 2, 1940 |
| 2,277,198 | Auer | Mar. 24, 1942 |
| 2,349,297 | Neracher et al. | May 23, 1944 |
| 2,356,598 | Lang | Aug. 22, 1944 |
| 2,373,259 | Price | Apr. 10, 1945 |

FOREIGN PATENTS

| Number | Country | Date |
|---|---|---|
| 319,898 | Great Britain | Oct. 3, 1929 |

OTHER REFERENCES

Ser. No. 400,816, Lang (A. P. C.), published May 11, 1943.